US011970042B2

(12) United States Patent
John et al.

(10) Patent No.: US 11,970,042 B2
(45) Date of Patent: Apr. 30, 2024

(54) SUSPENSION ASSEMBLY

(71) Applicant: AL-KO INTERNATIONAL PTY LTD, Dandenong (AU)

(72) Inventors: Jibu John, Dandenong (AU); John Lizza, Dandenong (AU)

(73) Assignee: AL-KO INTERNATIONAL PTY LTD (AU)

( * ) Notice: Subject to any disclaimer, the term of this patent is extended or adjusted under 35 U.S.C. 154(b) by 61 days.

(21) Appl. No.: 17/439,538

(22) PCT Filed: Mar. 13, 2020

(86) PCT No.: PCT/AU2020/050241
§ 371 (c)(1),
(2) Date: Sep. 15, 2021

(87) PCT Pub. No.: WO2020/186294
PCT Pub. Date: Sep. 24, 2020

(65) Prior Publication Data
US 2022/0153073 A1    May 19, 2022

(30) Foreign Application Priority Data
Mar. 15, 2019  (AU) .................................. 2019900864

(51) Int. Cl.
*B60G 3/14*    (2006.01)
*B60G 7/00*    (2006.01)

(52) U.S. Cl.
CPC .............. *B60G 3/14* (2013.01); *B60G 7/001* (2013.01); *B60G 2200/1322* (2013.01);
(Continued)

(58) Field of Classification Search
CPC ......... B60G 7/001; B60G 3/207; B60G 9/003
(Continued)

(56) References Cited

U.S. PATENT DOCUMENTS 2,532,076 A * 11/1950 Raney ...................... A01C 9/00
                                                            280/43
5,639,110 A *  6/1997 Pierce ..................... B60G 9/003
                                                            280/124.11
(Continued)

FOREIGN PATENT DOCUMENTS

AU     2012216240 B1    8/2013
EP        1640249 A1 *  3/2006    ........... B60G 21/051
(Continued)

OTHER PUBLICATIONS

Computer generated English translation of EP 1640249 to Lemasson et al. (Year: 2023).*
(Continued)

*Primary Examiner* — Paul N Dickson
*Assistant Examiner* — Tiffany L Webb
(74) *Attorney, Agent, or Firm* — Lerner David LLP

(57) ABSTRACT

A suspension assembly for a vehicle may have a first end for pivotal mounting to a structural member of the vehicle and a second end opposite the first end for attachment of a damping arrangement and a stub axle. The suspension assembly may include first and second shell components that are welded together to form a substantially hollow body between the first and second ends.

16 Claims, 6 Drawing Sheets

(52) U.S. Cl.
CPC ............... *B60G 2204/1244* (2013.01); *B60G 2204/129* (2013.01); *B60G 2204/148* (2013.01); *B60G 2206/012* (2013.01); *B60G 2206/013* (2013.01); *B60G 2206/12* (2013.01); *B60G 2206/124* (2013.01)

(58) Field of Classification Search
USPC ....................................................... 280/688
See application file for complete search history.

(56) References Cited

U.S. PATENT DOCUMENTS

| | | | | |
|---|---|---|---|---|
| 5,690,353 | A * | 11/1997 | Vandenberg | B60G 7/001 280/124.116 |
| 6,758,535 | B2 | 7/2004 | Smith | |
| 7,267,348 | B1 * | 9/2007 | Klein | B60G 11/27 280/124.1 |
| 7,284,630 | B2 * | 10/2007 | Bryan | B62D 49/06 280/43 |
| 8,523,208 | B2 * | 9/2013 | Rezania | B60G 7/001 280/681 |
| 9,333,826 | B1 * | 5/2016 | Saieg | B60G 9/003 |
| 10,137,951 | B2 * | 11/2018 | Gray | B62D 63/062 |
| 10,232,893 | B2 * | 3/2019 | Ohhama | B23K 20/125 |
| 10,882,556 | B2 * | 1/2021 | Van Deventer | B60G 3/14 |
| 11,472,246 | B2 * | 10/2022 | Bosschieter | B62D 59/04 |
| 2006/0284449 | A1 * | 12/2006 | Miyahara | B62D 21/11 296/205 |
| 2012/0098228 | A1 | 4/2012 | Wilson et al. | |
| 2018/0215414 | A1 * | 8/2018 | Van Deventer | B60G 3/14 |

FOREIGN PATENT DOCUMENTS

| | | |
|---|---|---|
| EP | 1380455 B1 | 2/2011 |
| FR | 2570994 A1 | 4/1986 |
| WO | 9528294 A2 | 10/1995 |
| WO | 2007066205 A1 | 6/2007 |

OTHER PUBLICATIONS

International Search Report for PCT/AU2020/050241 dated Apr. 24, 2020; 5 pages.

* cited by examiner

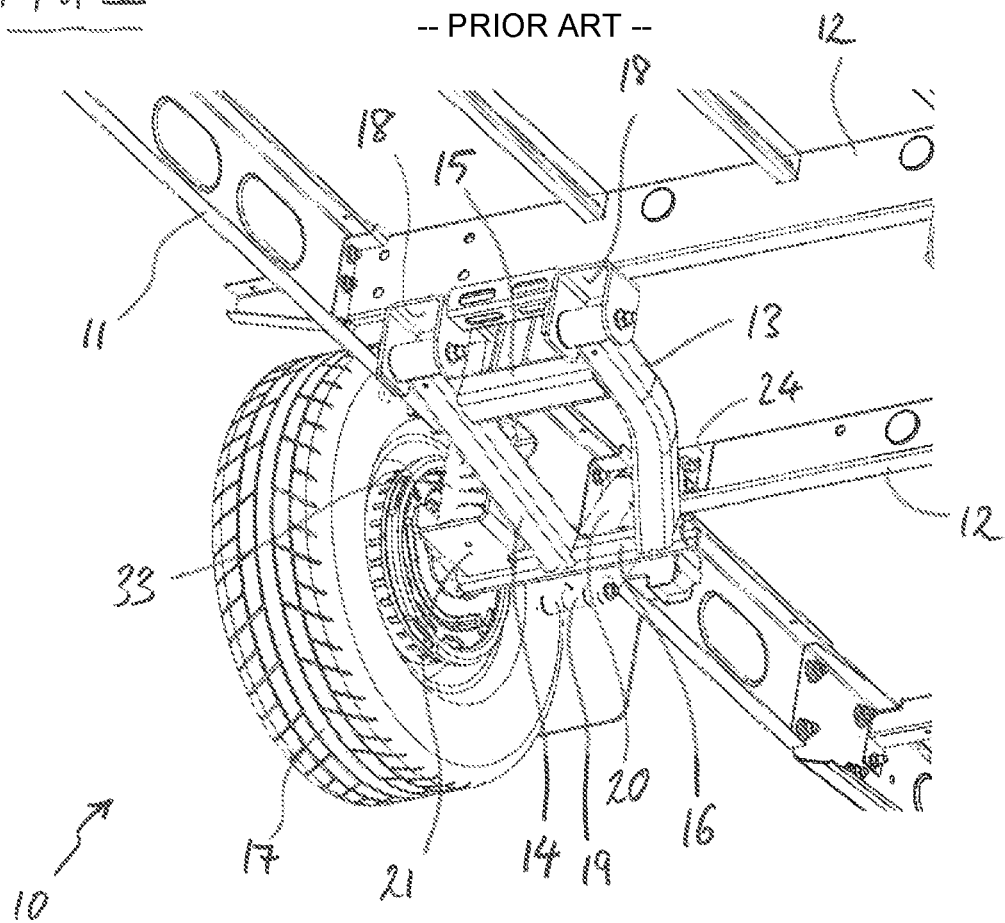
Fig 1 -- PRIOR ART --
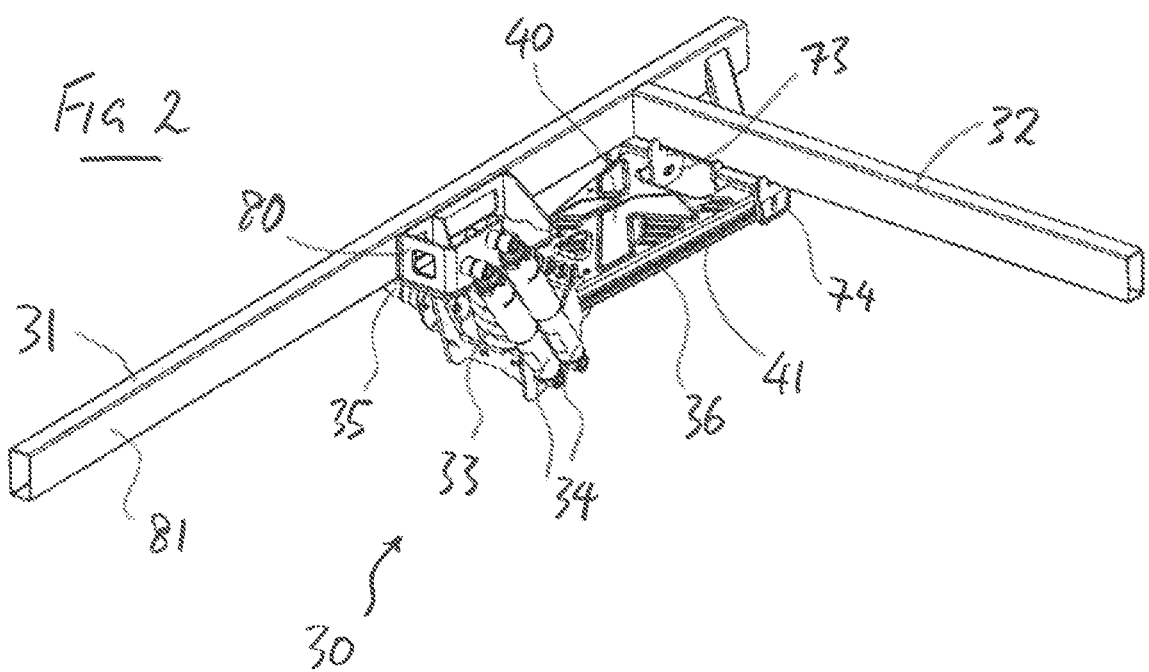
Fig 2

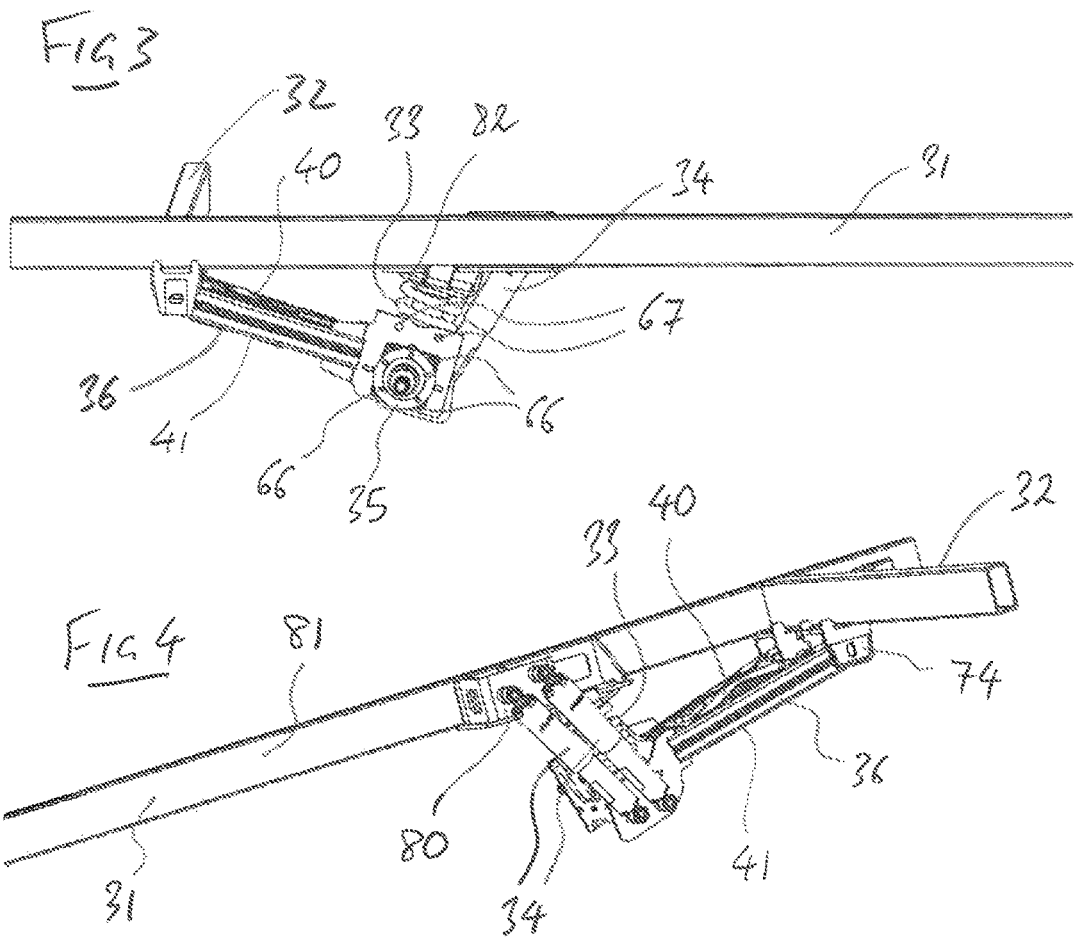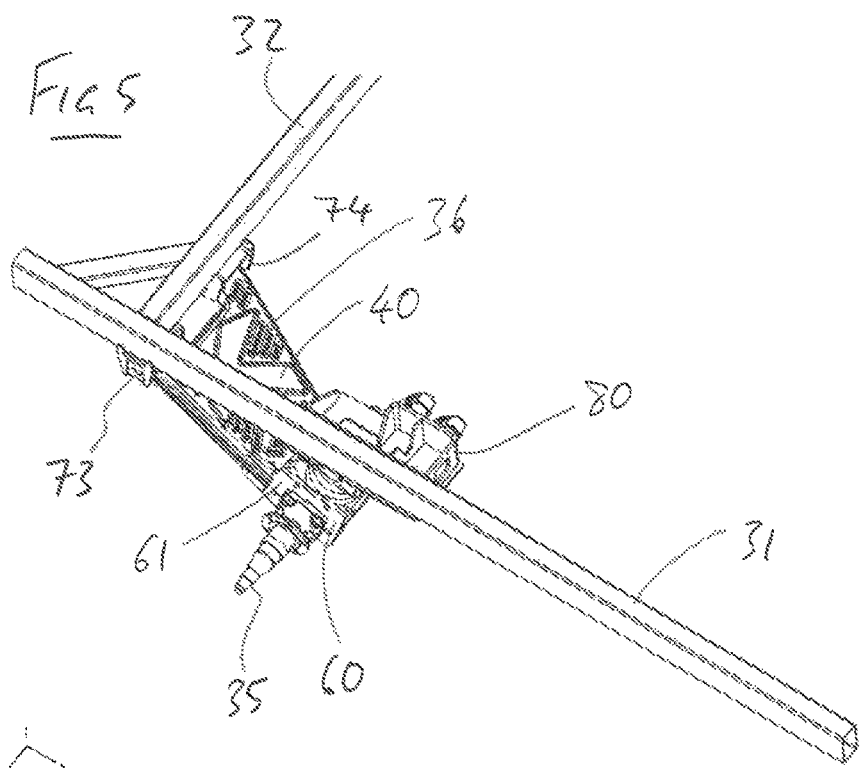

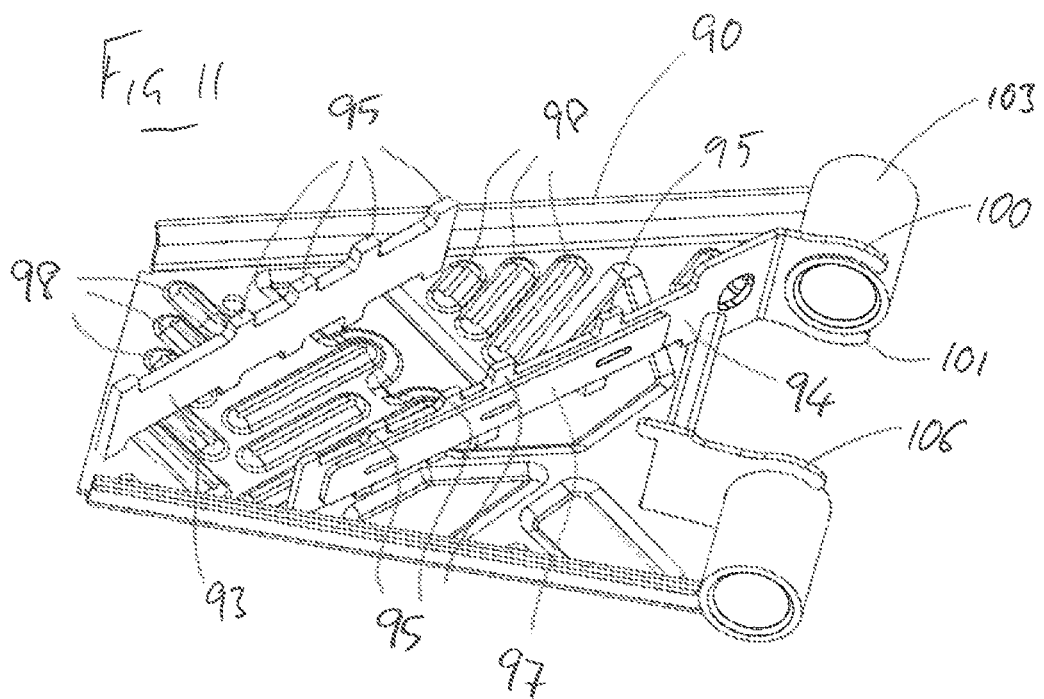
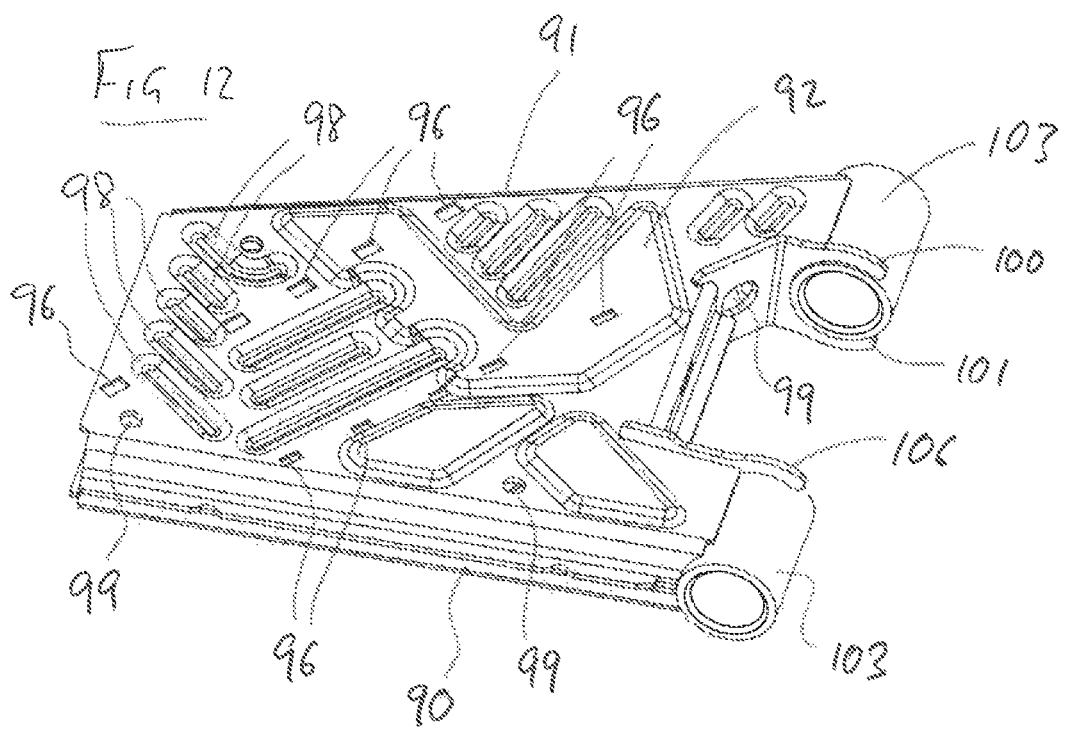

SUSPENSION ASSEMBLY

PRIORITY CROSS-REFERENCE

This application is a national phase entry under 35 U.S.C. § 371 of International Application No. PCT/AU2020/050241, filed on Mar. 13, 2020, which claims priority to Australian Provisional Patent Application No. 2019900864 filed on Mar. 15, 2019, the entire contents of which are incorporated herein by reference.

TECHNICAL FIELD

The present invention relates to a suspension assembly, and has been developed principally for use in relation to caravans and trailers. It will be convenient to describe the invention in relation to its use in caravans, but it is to be appreciated that the invention could be used in trailers as well as other vehicles, such as in motor vehicles for example.

BACKGROUND OF THE INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Suspension assemblies for caravans are required to absorb and cushion loads that would otherwise transmit between the wheels of the caravan and the caravan body or chassis, particularly during travel of the caravan along roads and tracks. Caravans often carry many loose domestic objects such as crockery and chairs and excessive transmission of vibrations into the caravan cabin can cause those objects to move from stored positions, potentially causing damage to the objects themselves or to other parts of the caravan cabin, such as by impact against walls and doors. Excessive transmission of vibrations into the caravan cabin can also cause damage to appliances within the cabin, such as dishwashers and clothes washers, that are exposed to those vibrations. Suspension assemblies are thus designed to minimise the normal vibrations that are experienced during travel of a caravan along roads and tracks.

Sudden impact loads, such as might result from the caravan wheels entering a pothole in the road or track, or riding over ruts in the road or track, need also to be absorbed and cushioned.

Design parameters for suspension assemblies for caravans also include the need to maximise the grip between the tyres of the caravan and the road or track surface over which the caravan travels, and to retain steering stability and handling, particularly for the comfort of the passengers in the towing vehicle.

A further design parameter for suspension assemblies is to minimise the weight of the assembly. Reduced weight can reduce the energy to tow a caravan and thus provide environmental benefits, or in the alternative, can allow increased payload in other areas of the caravan. A still further design parameter for suspension assemblies is to minimise the complexity of the assembly and to minimise the number of assemblies required across a range of suspension assemblies to reduce stock requirements for manufacturers and suppliers.

The present invention seeks to provide new forms of suspension assembly that overcomes one or more of the drawbacks associated with prior art suspension assemblies, or that provides an improved suspension assembly.

SUMMARY OF THE INVENTION

According to one aspect of the present invention there is provided a suspension assembly for a vehicle, the suspension assembly having a first end for pivotal mounting to a structural member of the vehicle and a second end opposite the first end for attachment of a damping arrangement and a stub axle, the suspension assembly including first and second shell components and which are welded together to form a substantially hollow body between the first and second ends.

A suspension assembly according to the above aspect of the invention might otherwise be known as a trailing arm assembly, but the expression "suspension assembly" will be the name used to describe this type of assembly throughout this specification. It will be understood that the suspension assembly according to the above aspect of the invention comprises the first and second shell components and is intended to be used with a damping arrangement. In other forms of the invention, the suspension assembly will include both the first and second shell components and a damping arrangement.

A suspension assembly according to the above aspect of the invention advantageously can be formed to have a reduced weight compared to other prior art assemblies that would be used in the same installation. The shell construction is distinct from typical prior art trailing arm assemblies which are generally formed from RHS steel tube that is welded together. FIG. 1 illustrates one type of this form of prior art suspension assembly construction and is discussed in more detail later herein. The present applicant has found that by using the shell construction described above, a weight reduction over a similar construction using RHS steel tube, is achieved.

Also, a suspension assembly according to the above aspect of the invention advantageously can also be formed to have similar or increased stiffness compared to construction using RHS tube, but with the weight saving discussed above. Further advantages have been realised in stock reduction and manufacturing benefits.

The advantages referred to above, that relate to stock reduction and manufacturing benefits arise because the first and second shell components of the suspension assembly according to the above aspect of the invention can be substantially identical to each other. In this form, each of the first and second shell components can have a generally planar and major broad section, and laterally extending wall or skirt sections (hereinafter "wall sections"), the wall sections being welded together to form a peripheral wall of the hollow body. The wall sections extend laterally to the planar broad section and in some forms of the invention, the lateral extension is a generally normal extension or generally at about 90° to the broad section. To assist the pressing operation, the walls can have a draft angle of about 1.5 degrees from normal. The wall sections can each have a peripheral edge spaced from or distal to the broad section and the first and second shell components can be welded together along the peripheral edges of the respective wall sections of the first and second shell components. The peripheral edges can be turned out of the plane of the wall sections, such as bent approximately perpendicular to the plane of the wall sections to present a greater surface area for welding. The depth or height of the wall sections can be generally constant so that once the first and second shell components are welded together, the spacing between the facing broad sections of the shell components is generally constant throughout the hollow body. The spacing between the facing broad sections of the shell components in prototype forms of the invention can be in the order of about 60 mm.

The first and second shell components can be substantially identical to each other. The benefit in this form of the invention is that for manufacturing purposes, there is no requirement for two different shell components. Rather, the same shell component can be used for either of the first and second shell components. This reduces manufacturing costs given that only one form of shell component needs to be formed for each different size or type of suspension assembly, while storage and supply is simplified given that separate left or right, or top and bottom shell components are not required. Construction of the hollow body of the suspension assembly is also simplified given that any two shell components can be welded together rather than requiring manufacturing personnel or robotic equipment to select left or right, or top and bottom shell components.

The broad sections of the first and second shell components can include ribs and/or grooves for stiffening purposes. The ribs and/or grooves can be the same in each of the broad sections so that the first and second shell components can be substantially identical to each other, or they can be different to reflect different stiffening requirements of left or right, or top and bottom shell components. Given the benefits considered to arise as a result of manufacturing the first and second shell components as substantially identical to each other, the adoption of different stiffening arrangements is only expected where particular load arrangements justify the loss of the stated benefits.

Further stiffening can be provided within the hollow body between the first and second shell components by one or more stiffening ribs or plates that extend across the hollow body. The stiffening ribs or plates can be metal plates, such as steel or aluminium plates and can extend between the first and second ends of the suspension assembly, or between sides of the suspension assembly, or at an oblique angle across the hollow body. The stiffening ribs or plates can connect to end walls and/or side walls of the suspension assembly within the hollow body, and/or they can connect to inward facing surfaces of one or both of the first and second shell components. The stiffening ribs or plates can include projections that enter openings or slots provided in the first and second shell components to locate the ribs or plates relative to the first and second shell components and that location may be sufficient on its own, or may be combined with welding of the ribs or plates to the first and second shell components and/or end walls and/or side walls of the suspension assembly. The welding may be spot welding at certain points along the stiffening ribs or plates.

Any number of stiffening ribs or plates can be employed. One, two or three ribs or plates can be employed with prototypes tested to date including three ribs or plates, two of which that extend at an oblique angle across the hollow body and which are generally parallel to each other. Where a greater amount of stiffening is required, ribs or plates can be connected together by welding, bolting or riveting for example, to increase the thickness of the rib or plate, without having to employ metal plate that is thicker or of a different gauge.

The wall sections of the first and second shell components can be continuous about the broad sections, or the wall sections can be discontinuous or interrupted. In some forms of the invention, discontinuities can be provided to assist in the draining of protective coatings applied to the hollow body and other connected parts of the suspension assembly by dipping. That is, the hollow body and other connected parts of the suspension assembly are often dipped in a bath of coating liquid and that liquid can find its way into the interior of the hollow body, so that discontinuities in the wall sections can allow the liquid to drain out of the hollow body. The discontinuities can also be used for pressed tooling location and routing of cables, such as brake cables.

Likewise, the broad section can include openings for the same draining purpose.

The first and second shell components can be formed in any suitable manner. The preference is that the shell components are formed by stamping or pressing. Advantageously, stiffening ribs and/or grooves can be formed as part of a stamping or pressing process. The stamping or pressing process is quick and well established and so shell components can be easily formed by that process. The finish provided by the stamping or pressing process is also sufficiently accurate that further treatment of the shell components is not ordinarily required, apart from the addition of protective coating discussed above. Nevertheless, further machining of the shell components can be undertaken if required and in particular, this may be necessary in order to prepare the peripheral edges of the wall sections for welding.

The shell components can be formed of any suitable metal and have any suitable dimensions. Advantageously, early testing has shown that a wall thickness reduction can be achieved in a suspension assembly according to the invention as compared to the wall thickness of RHS tube that is normally used in prior art trailing arm assemblies, when the same metal is used. The metal will normally be steel. Early testing has shown that a wall thickness of 4 mm can be used in the shell components of a suspension assembly according to the invention as compared to a wall thickness of 5 mm in the RHS tube that is normally used in prior art trailing arm assemblies. This wall thickness reduction provides an immediate weight reduction, estimated roughly to be in the region of 20% compared to prior art trailing arm assemblies that employ RHS tube.

The hollow body can be formed to have a pair of side walls and opposite first and second ends. The hollow body can be formed as a parallelogram in which the side walls are generally parallel, or the side walls can be non-parallel, but generally straight, so that the side walls of the hollow body taper from the first end to the second end to form a narrow end and a wide end. The wide end can form the first end for pivotal mounting to a structural member of the vehicle, and the width of that end advantageously provides a more stable connection of that end to a chassis rail or beam. The narrow end can form the second end, or can extend from or connect to the second end for attachment of a damping arrangement.

The tapering arrangement can be symmetrical about a central axis of the hollow body between the first and second ends, or it can be asymmetrical. In some forms of the invention, one side wall of the hollow body which in use once assembled to a vehicle, is an outer side wall of the hollow body, can be generally parallel to or just approximately aligned with the side of the vehicle to which the suspension assembly is attached, while an inner side wall of the hollow body can be angled. The outer side wall can then fit along a chassis beam of the vehicle while the inner side wall is at an angle to the chassis beam, creating the narrow and wide ends discussed above.

In some forms of the invention, the narrow end of the hollow body can connect to an assembly for attachment of a damping arrangement and a stub axle while the wide end can connect to an assembly for pivotal mounting to a support member of the vehicle.

The assembly for attachment of a damping arrangement and a stub axle can include a first support plate that extends from an end of the hollow body, such as the narrow end and that supports one end of a spring or air bag or other damper. The assembly can further include an attachment portion for the attachment of one end of one or more shock absorbers. The attachment portion can be a second support plate that extends generally perpendicular to the first support plate. The end or ends of the one or more shock absorbers can be mounted to stubs or bosses that project from the second support plate.

The assembly can further include an attachment portion for the attachment of the stub axle. The attachment portion can be a third support plate that extends generally perpendicular to the first support plate and generally parallel to the second support plate, but which is spaced from the second support plate and which in use, is positioned approximately aligned with the side of the vehicle to which the suspension assembly is attached, ie aligned with the chassis rail or beam of the vehicle. The stub axle is provided to mount or support the wheel of a vehicle and so the stub axle needs to project outwardly of the side of the vehicle to which the suspension assembly is attached. In some forms of the invention, the stub axle is bolted to the third support plate. For this, the third support plate can include openings positioned for receipt of bolts associated with the stub axle. Advantageously, the third support plate can include multiple openings, or an array of openings so that the stub axle can be positioned on or connected to the third support plate at different positions, in particular at two different height positions. A greater number of different positions could be provided for, although two different height positions is considered at this stage to be sufficient. This allows the position of the stub axle to be selected based on the requirements of the vehicle to which the suspension assembly is to be connected. These different requirements can include the wheel size and the weight of a caravan or boat or other body being towed.

The stub axle attachment portion can alternatively be a support plate which is employed in an assembly that does not include the first and/or second support plated mentioned above. Thus, the assembly can include a support plate for attachment of the stub axle without either of the first and second support plates described above, or with just one of the first and second support plates described above.

The different requirements can depend on type of application of the suspension assembly, namely whether it is installed in an off-road vehicle or an on-road vehicle. Normally for on-road caravans, the stub axle is positioned at a higher position so that the caravan sits lower and is thus more stable on the road. For off-road caravans, the stub axle is usually positioned at a lower position so that the caravan sits higher and thus provides greater ground clearance. Moreover, in some instances, customers have specific requirements relative to ride height positions. The invention can thus be configured to give flexibility in relation to the height of the stub axle.

The assembly for attachment of a damping arrangement and a stub axle can further include a bracket for connection or mounting to a support member of a vehicle, such as a chassis rail or beam. That support member typically will be a different support member to that which the pivotal mounting assembly is connected. In some arrangements, the respective support members will be perpendicular to each other.

The support member of the vehicle to which the assembly for attachment of a damping arrangement and a stub axle is attached, can be a member that extends generally in the normal forward driving direction of the vehicle. The arrangement of the invention can include two shock absorbers and these can be arranged in a plane that is generally parallel to the support member. The shock absorbers are thus in-line in the normal forward driving direction of the vehicle. This provides advantages including that the overall assembly is compact, there can be lower stress on the support member, an additional stiffening cross-rail or cross-member is not required (as is sometimes required in the prior art) and so a reduced number of components is required for installation.

The assembly for attachment of a damping arrangement and a stub axle can be welded to the hollow body or otherwise bolted to the body. In some forms of the invention, the assembly for attachment of a damping arrangement and a stub axle, or a portion of the assembly, can be formed as an integral extension of one of the first and second shells.

The opposite end of the hollow body (the first end) can connect to an assembly for pivotal mounting to a support member of the vehicle, again, a chassis rail or beam for example. The opposite end can be the wide end discussed above. In one form of pivotal mounting assembly, a pair of U-brackets are mounted or connected to a support member of a vehicle chassis and a pair of circular tubes is welded to the first end of the hollow body. A pair of suspension bushes is inserted into the tubes and each is bolted to a respective U-bracket, and an eccentric bolt extends respectively through each of the suspension bushes and U-brackets. The circular tubes and thus the hollow body can rotate or pivot as required about the eccentric bolts.

The hollow body can be configured to provide a pair of extensions to which the circular tubes are welded. The end of the hollow body which connects to the assembly for pivotal mounting can include a recess between the pair of extensions. The extensions can extend inboard or inwardly from opposite side edges of the hollow body.

According to another aspect of the present invention there is provided a suspension assembly having a first end for pivotal mounting to a structural member of the vehicle and a second end opposite the first end for attachment of a damping arrangement and a stub axle, the suspension assembly facilitating attachment of the stub axle in at least two different proximal positions.

A suspension assembly according to the above aspect of the invention advantageously provides benefits already discussed above in relation to alternative attachment points for the stub axle. In particular, the alternative attachment points can allow the stub axle to be positioned at different height positions relative to the suspension assembly. As previously indicated, this allows the position of the stub axle to be selected based on the requirements of the vehicle to which the suspension assembly is to be connected. These different requirements can include the wheel size and the weight of the caravan being towed.

The suspension assembly according to this aspect of the present invention is intended to facilitate attachment of the stub axle in at least two different proximal positions so that the alternative positions of attachment are relatively close together. For example, where only two alternative positions of attachment are provided, these could provide for a height adjustment of the stub axle of about 50 mm. A further and third alternative position of attachment could be provided to give a further 50 mm height adjustment, or the adjustment distance could be reduced, say to a distance of 30 mm between the three positions, or between two of the three positions. The spacing between the alternative positions of attachment can be given any suitable dimension.

The suspension assembly can include a support plate for attachment of the stub axle to which the stub axle can be bolted. The support plate can include openings positioned for receipt of bolts associated with the stub axle. The support plate can include multiple openings, or an array of openings so that the stub axle can be positioned on or connected to the support plate at different positions, in particular at different height positions. The stub axle can include a connection plate at one end and the plate can include bolt openings for matching with openings in the support plate. The support plate can be of any suitable size to facilitate the range of adjustment that is required.

This aspect of the present invention in which the stub axle is connected to the suspension assembly by bolting also means that the stub axle can be removed and changed if necessary. Stub axles are rated according to maximum loading and some vehicles will require the original stub axle to be replaced with a higher load rated stub axle if the vehicle itself becomes heavier, such as by addition of equipment. By the present invention, removal and replacement of the stub axle is relatively easy, particularly when compared to current prior art suspension assemblies, so that upgrading the stub axle to a higher load rating is not difficult.

According to another aspect of the present invention there is provided a forged stub axle for use in a suspension assembly. In this aspect of the invention, the suspension assembly can have a first end for pivotal mounting to a structural member of the vehicle and a second end opposite the first end for attachment of a damping arrangement, a stub axle being attached at the second end and the stub axle being forged. The suspension assembly can be of any one of the kinds discussed above. The applicant has discovered that forging the stub axle gives significant strength improvements when compared to machined stub axles of the kind that are part of the prior art.

A forged stub axle can be formed from an initial forged blank that is further machined to one of various bearing profiles and lengths as required by the customer. This is distinct from prior art stub axles in which an initial square bar is cut and machined to meet customer requirements.

Advantages of this aspect of the invention have been discussed above, but further advantages provided by different embodiments of the invention include easier installation and flexible selection options, such as for the type of stub axle to be applied.

BRIEF DESCRIPTION OF DRAWINGS

In order that the invention may be more fully understood, some embodiments will now be described with reference to the figures in which:

FIG. 1 illustrates a prior art form of suspension assembly.

FIGS. 2 to 5 are views of a suspension assembly according to the present invention.

FIG. 11 is a perspective view of a further shell component for constructing a hollow body, and showing stiffening plates extending across the shell component.

FIG. 12 is a perspective view showing a shell component attached to the shell component of FIG. 11 to form a hollow body.

DETAILED DESCRIPTION

Figure 6:
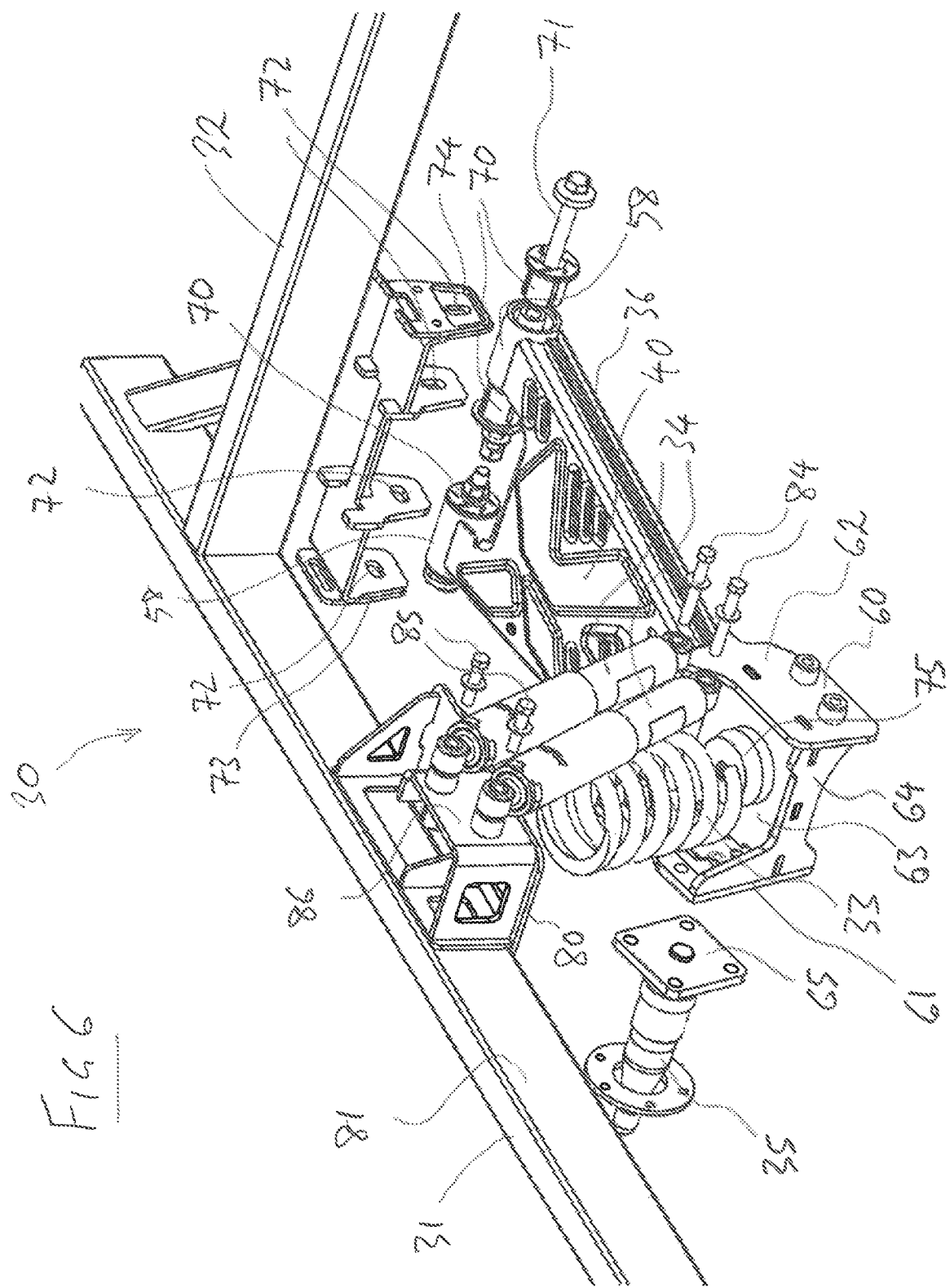
FIG. 6 is an exploded view of the suspension assembly of FIGS. 2 to 5.

FIG. 1 illustrates a prior art form of suspension assembly 10 which is manufactured using RHS steel tube. FIG. 1 illustrates just a portion of a chassis of a vehicle to which a single suspension assembly 10 is attached and so the suspension assembly 10 illustrated in FIG. 1 attaches to a single wheel. Clearly in practice, a chassis would include a pair of suspension assemblies to support a pair of wheels on opposite sides of the chassis, or additional suspension assemblies would be required for each wheel where the vehicle includes more than two wheels.

The suspension assembly 10 illustrated in FIG. 1 is attached between a longitudinal chassis beam 11 and transverse chassis beams 12. The suspension assembly 10 includes a pair of arm members 13 and 14, a transverse member 15 and an axle member 16. The axle member 16 extends to a stub axle which is concealed in FIG. 1 but which projects from one end of the axle member 16 on which the wheel 17 is mounted for rotation.

Each of the arm members 13, 14, the transverse member 15 and the axle member 16 are formed from RHS tube steel, which are welded together. The arm member 13 is formed with a bend about midway along its length.

One end of each of the arm members 13 and 14 is pivotally connected to a respective U-bracket 18, each of which is welded to an underneath surface of the chassis beam 12. The opposite ends of the arm members 13 and 14 are welded to the axle member 16. The axle member 16 includes a bracket 19 for connection to a bottom end of a pair of damping struts 20, while a plate 21 is welded between the arm member 14 and the axle member 16 to support the bottom end of a coil spring 33. Each of the damping struts 20 and the coil spring 23 extend upwardly for connection to brackets (bracket 24 for the damping struts 20) for location relative to the chassis beams 11 and 12.

As indicated earlier herein, the applicant has developed the present invention to provide advantages over the RHS steel tube construction principally used in prior art suspension assemblies. The applicant has also sought to provide a suspension assembly in which the strength and stiffness is at least equal to prior art suspension assemblies but preferably is increased and in which the height of the stub axle can be adjusted and the stub axle can be removed for replacement purposes. The applicant has also sought to provide a new form of stub axle that has manufacturing benefits also.

An embodiment of the present invention is illustrated in FIGS. 2 to 10. FIGS. 2 to 5 illustrate different views of an assembled suspension assembly 30, while FIG. 6 is an exploded view of the assembly 30. FIGS. 7 to 10 illustrate portions of the assembly 30 in isolation.

The suspension assembly 30 is shown in FIGS. 2 to 5 attached to a pair of chassis beams 31 and 32. The chassis beams 31 and 32 could be part of the undercarriage of a caravan or motorhome, or they could be part of a trailer, in particular a heavy duty and/or off road trailer.

The assembly 30 has a first end for pivotal mounting to the chassis beam 32 and a second end opposite the first end for attachment of a damping arrangement, which is shown in the figures as comprising a coil spring 33 and a pair of damping struts 34. The second end also includes facility for attachment of a stub axle 35.

Between the pivotal mounting of the assembly 30 to the chassis beam 32 and the damping arrangement and stub axle attached to the second and opposite end, is a hollow body 36. The hollow body 36 is formed by a pair of shell components, which are press formed and welded together. The use of the hollow body 36 has been found advantageously to provide advantages over the use of RHS steel tube construction, including that the required strength and stiffness can be provided while overall weight can be reduced.

Figure 7:
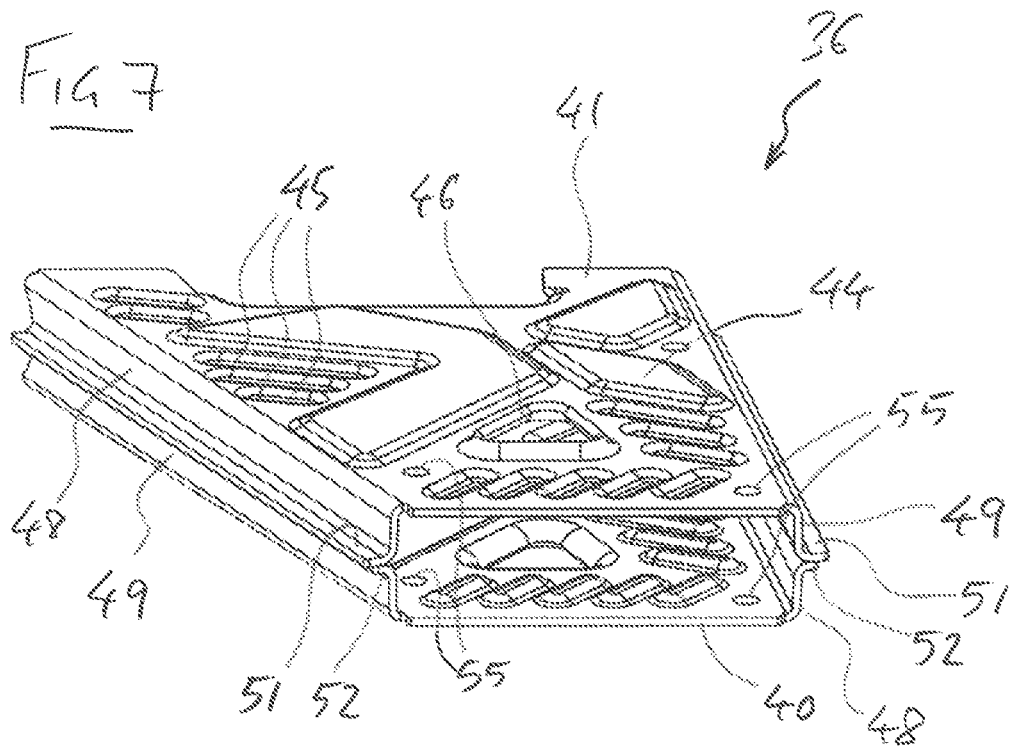
FIGS. 7 and 8 are different perspective views of the hollow body portion of the suspension assembly of FIGS. 2 to 6.
Figure 8:
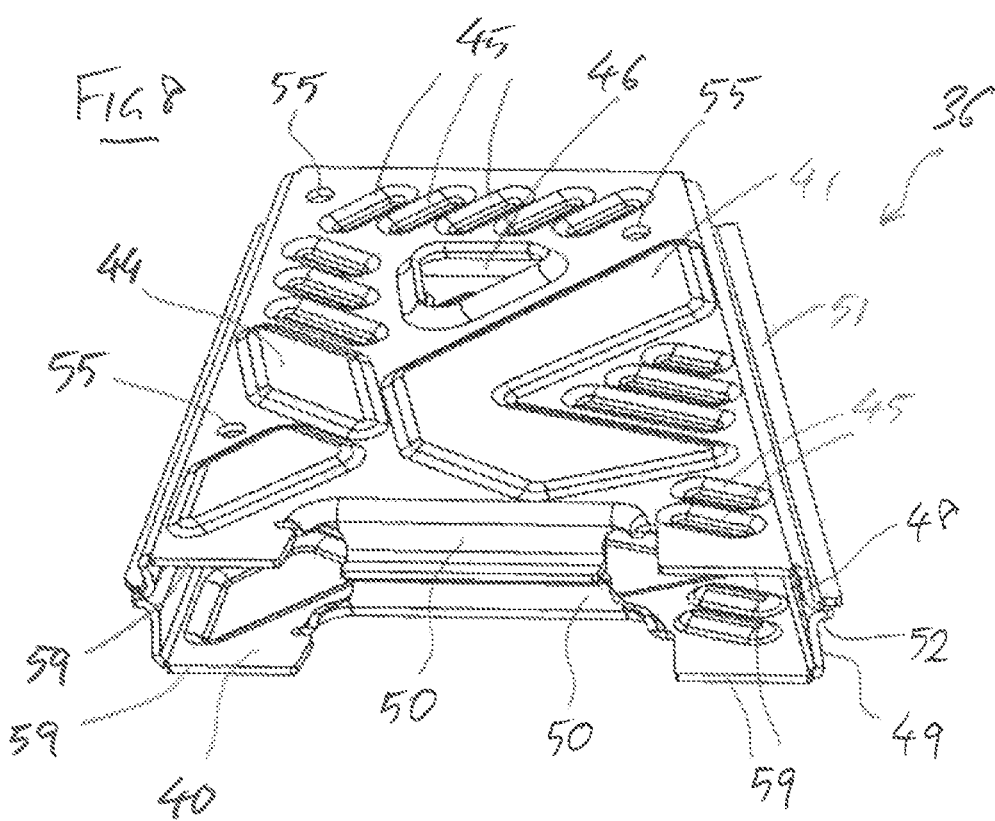
Figure 9:
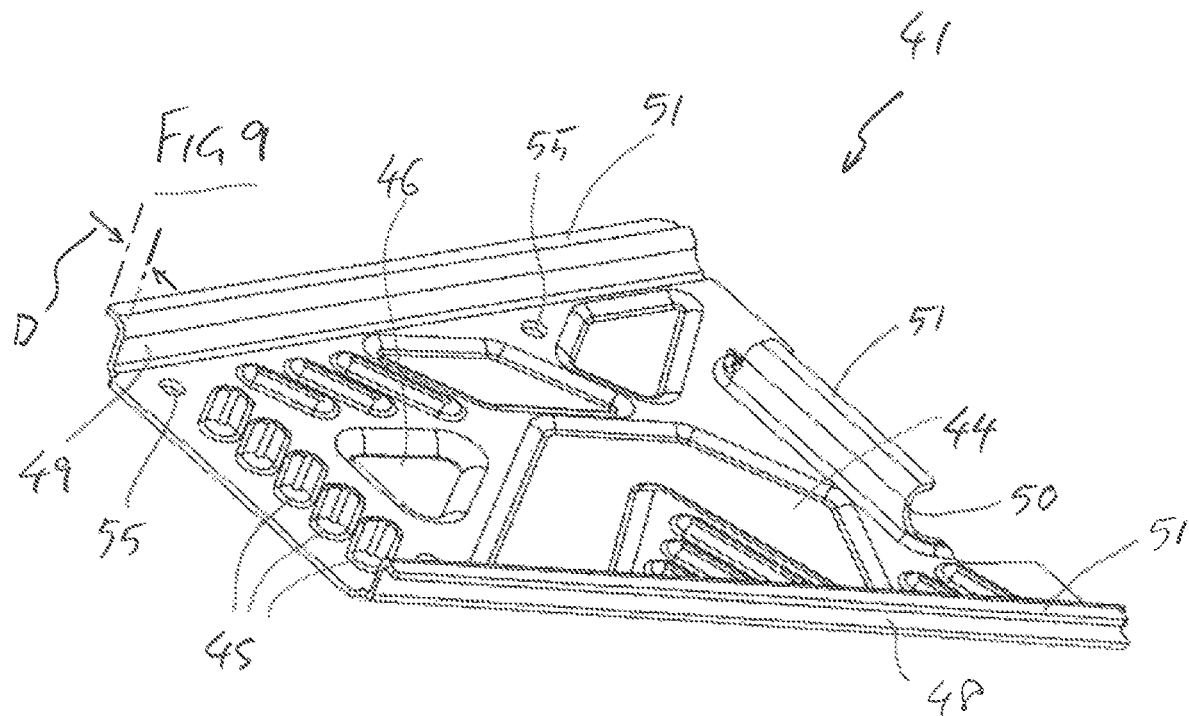
FIG. 9 is a perspective view of one of the shell components of the hollow body of FIGS. 7 and 8.

The hollow body 36 is shown in isolation in FIGS. 7 and 8, while a single one of the shell components 41 is shown in FIG. 9, taken from a perspective looking into or inside the shell component 41. FIGS. 7 and 8 show the hollow body 36 upside down in contrast to the orientation of the earlier figures, in order to show that the hollow body 36 is substantially the same in either orientation.

The shell components 40 and 41 as shown in the figures are formed by pressing. FIGS. 7 to 9 show that each of the shell components 40 and 41 has a major broad section 44 which is generally planar, save for various strengthening ribs or grooves 45 and a triangular opening 46. The shell components 40 and 41 also show some abstract and cosmetic pressings that are provided for identifying the manufacturer of the suspension assembly 30 as the present applicant.

The shell components 40 and 41 further include laterally extending walls or skirt sections 48, 49 and 50. When the shell components 40 and 41 are welded together, the wall sections 48 and 49 cooperate to form side walls of the hollow body 36, while the wall sections 50 cooperate to form an end wall at the end of the hollow body that connects pivotally to the chassis beam 32.

Each of the wall sections 48, 49 and 50 extends substantially perpendicularly to the broad section 44, with a draft angle of about 1.5 degrees from normal, and each includes a peripheral edge 51 or 52 which is bent or turned out of the perpendicular extension of the wall sections so as to present a broader welding surface for welding the shell component 41 to the shell component 40. The shell components 40 and 41 are thus welded along three edges. The welds themselves are not shown in the figures.

Only the single shell component 41 has been illustrated in isolation in FIG. 9, because the construction of the shell component 40 is substantially identical to the shell component 41, except in respect of the depth D of the peripheral edge 51 of the shell component 41 compared to the similar peripheral edge 52 dimension of the component 40. Thus the similar peripheral edges of the component 40, two of which are identified by reference numeral 52 in FIG. 7, are slightly shorter in depth than the peripheral edges 51. The reason for this difference in depth is to facilitate a filet weld between the respective edges.

As seen in FIGS. 7 and 8, the respective shell components 40 and 41 are welded together along the respective peripheral edges 51 and 52. Moreover, as shown in FIG. 8 only, the peripheral edge 51 (see also FIG. 9) of the wall section 50 of shell component 41 is welded to the corresponding peripheral edge of the wall section 50 of the shell component 40. The shell components 40 and 41 are thus welded along each of the wall sections 48, 49 and 50 to form the hollow body 36.

Figure 10:
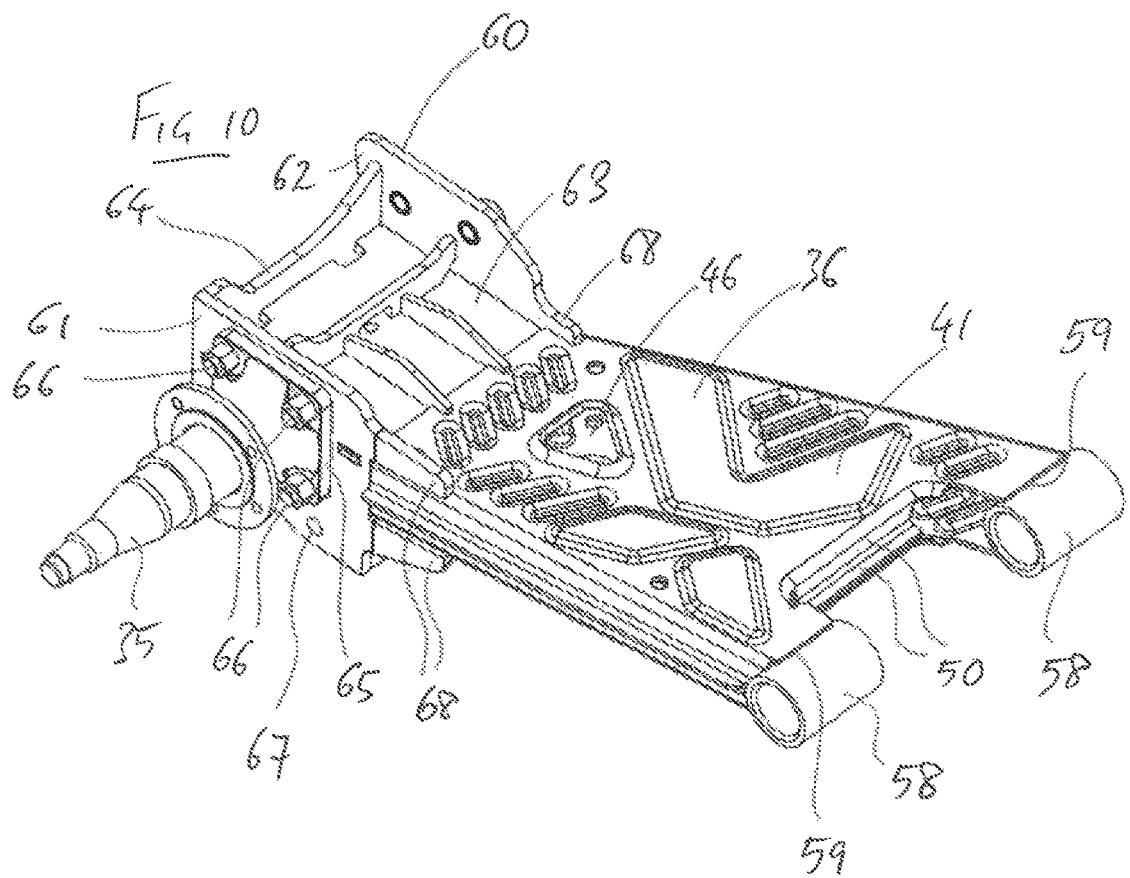
FIG. 10 is an underneath view of the hollow body of FIGS. 7 and 8 with cylindrical housings attached to the first end and a plate support for a damping arrangement and a stub axle attached to the second end.

The periphery of the hollow body 36 is open or discontinuous in sections other than at the welded wall sections 48, 49 and 50. The open sections allow other components as are described later herein to be attached to the hollow body 36 and to permit drainage of protective liquid coatings that are applied to the hollow body and other connected parts of the suspension assembly by dipping. Thus, the hollow body 36 shown in FIGS. 7 and 8 and other connected parts as shown in FIG. 10 can be dipped in a bath of protective coating liquid and on removal from the bath, excess coating liquid can be drained from within the interior of the hollow body 36 through the discontinuities in the wall sections 48, 49 and 50 and other drainage openings, including the opening 46 and. The discontinuities can also be used for pressed tooling location and routing of cables, such as brake cables.

The opening 46 can be laser cut from a pre-pressed metal blank prior to pressing, or it can be cut later from the pressed part. Likewise, the drain openings 55 can be applied prior to or following pressing. The drain openings 55 can be drilled or otherwise formed. The shell components 40 and 41 can be formed from grade 350 mild steel for example.

FIG. 10 shows the hollow body 36 from an underneath view, with further components attached. Thus, FIG. 10 shows the hollow body 36 with a pair of circular tubes or housings 58 welded to free edges 59 (see FIG. 8) of the hollow body 36.

FIG. 10 further shows that the opposite end of the hollow body 36 includes a welded plate assembly 60 for supporting the stub axle 35, as well as the coil 33 and the struts 34. The plate arrangement 60 includes a pair of side plates 61 and 62, a base plate 63 and an end plate 64. Strengthening or stiffening ribs are also provided (not numbered) as are welding fingers 68 that extend from the plates 61 and 62 to overlie the wall sections 48 and 49 for welding to the hollow body 36.

In FIG. 10, the stub axle 35 is shown bolted to the side plate 61. The stub axle 35 includes a base plate 65 through which four corner bolts 66 (only three of which are visible in FIG. 10) extend and which then extend through bolt holes in the base plate 61. This arrangement is also shown in the side view of the suspension assembly 30 shown in FIG. 3, with the exception that the respective views of FIGS. 3 and 10 are inverted. In FIG. 3, a pair of unused bolt holes 67 is visible and these unused bolt holes 67 make it possible for the stub axle 35 to be shifted on the side plate 61 to a second and higher position. Thus, the plate 61 is formed with eight openings so that the stub axle 35 can be positioned in one of two positions, being the lower position illustrated in FIG. 3, or an upper position which is not shown. The difference in height between those two positions in the embodiment illustrated, is 50 mm. Six of the eight openings are obscured in FIG. 3, being the four openings through which the corner bolts 66 extend and two further openings that the base plate 65 overlies in the position of the stub axle 35 in FIG. 3. Further openings could be provided for greater position adjustment.

The bolted arrangement of the stub axle 35 to the plate 61 also makes disconnection of the stub axle 35 from the suspension assembly 30 easy, simply by unbolting the corner bolts 66. This allows easy replacement of a damaged stub axle 35, or allows the replacement of the stub axle 35 with a higher load rated stub axle. All that is required is that the replacement stub axle be formed to have the same base plate 65 as the stub axle 35, or that the bolt openings in the replacement stub axle be formed to match the openings of the side plate 61.

With reference to the exploded view of FIG. 6, this shows the portion of the suspension assembly 30 illustrated in FIG. 10 in position relative to the other parts of the assembly 30. In FIG. 6, suspension bushes 70 are shown, one of which is shown already inserted into one of the housings 58 and the other is shown ready for insertion into the other of the housings 58. It can be seen that two bushes 70 are inserted into each of the housings 58 from opposite sides and that each bush 70 includes a flange for engagement against facing end edges of the housings 58. Further, an eccentric bolt 71 is shown ready for insertion into one of the bushes 70, through a sleeve if required for protection of the bolt, while the same form of eccentric bolt is already inserted into the other of the bushes 70.

The suspension bushes 70 are bolted to the respective U-shaped brackets 73 and 74. The bolts 71 extend through the bushes 70 and connect at either end into openings 72 of U-shaped brackets 73 and 74 that connect to the underside of the chassis beam 32, such as by welding. The housings 58 rotate or pivot about the bushes 70 and the bolts 71 to allow the suspension assembly 30 to rotate or pivot up and down to absorb load through the coil spring 33 and the damping struts 34 and to maintain tyre connection with a road surface.

The base plate 63 forms a seat for a bottom end of the coil spring 33 and FIG. 6 shows a centre support 75 that connects to the base plate 63 and that includes an extension that extends through the spring 33 to connect to the underneath surface of a further bracket 80 that attaches to a side surface 81 of the chassis beam 31, such as by welding. The coil spring 33 is thus captured in place about the centre support 75 between the base plate 63 and the bracket 80. As shown in FIG. 3, an upper end of the centre support 75 connects to an angled plate 82 of the bracket 80 and the upper end of the coil spring 33 rests against a facing surface of the plate 82. The extension can include a bump stop that is connected to the bracket 80 and that faces the centre support 75 so that upon a certain compression of the spring 33, facing ends of the centre support 75 and the bump stop engage and prevent further spring compression.

FIG. 6 also illustrates the bolting arrangement for bolting the struts 34 in place and the arrangement comprises a pair of bottom bolts 84 that extend through bottom ends of the struts 34 and into the side plate 62, while top bolts 85 extend through the top end of the struts 34 and into a side plate 86 of the bracket 80.

The suspension assembly 30 illustrated in the figures provides advantages over prior art assemblies that will be evident from the figures and the above discussion, but which importantly include that a similar or even greater strength is provided by the shell construction using the shell components 40 and 41, as compared to assemblies using RHS steel tube. A further advantage is in manufacturing speed, in which pressing the shell components 40 and 41 improves production time and efficiency as compared to production involved in bending and welding RHS steel tubes together.

FIGS. 11 and 12 show alternative shell component construction in which FIG. 11 shows a single shell component 90, while FIG. 12 shows a hollow body 91 formed from the shell component 90 and a further shell component 92 connected together. The hollow body 91 FIG. 11 includes stiffening ribs or plates 93, 94 that extend across the hollow body at an oblique angle. The ribs or plates 93, 94 include upper and lower locating projections 95 that are received in slots or openings 96 formed in the shell components 90, 92 and the projections 95 can be welded to the shell components 90, 92 if required. Sections of the ribs or plates 93, 94 between the projections 95 can also be welded, such as by spot welding. The rib or plate 94 also includes a reinforcing plate 97 welded to one side thereof. Reinforcing plates of this kind can be added to the plate 93 as well and can also be added to each side of the ribs or plates 93, 94, depending on the level of stiffness required. Reinforcing plates can be attached by welding, bolting or riveting for example.

The shell components 90, 92 also include strengthening ribs or grooves 98 in the major broad planar sections of the shell components 90, 92, although the pattern of ribs or grooves 98 is different from the strengthening ribs or grooves 45 shown in the shell components 40 and 41 and the shell components 90, 92 do not include a triangular opening 46 of the shell components 40 and 41. This shows that the pattern of ribs or grooves applied to the shell components can change. The shell components 90, 92 still include drainage openings 99.

The plate 94 is formed with a pair of locating fingers 100, 101 for welding attachment as shown to the outside surface of one end of one of the circular tubes or housings 103. A second plate 105 is provided with a pair of locating fingers 106 (only one of which is visible in FIGS. 11 and 12) for welding attachment as shown to the outside surface of one end of the other of the circular tubes or housings 103. The second plate 105 is welded to each of the shell components 90, 92 during assembly of the suspension assembly.

Otherwise, the hollow body 91 formed by the shell components 90, 92 operates in much the same way as the hollow body 36 of the earlier figures, with the major difference being in the provision of the stiffening ribs or plates 93, 94.

Moreover, the embodiments of the invention that has been developed to date are more compact than prior art RHS steel tube arrangements and so less space beneath the chassis of a vehicle is required for the suspension assembly to be accommodated.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A suspension assembly for a vehicle, the suspension assembly having a first end for pivotal mounting to a structural member of the vehicle and a second end opposite the first end for attachment of a damping arrangement and a stub axle, the second end including a support plate for stub axle attachment, the suspension assembly including first and second shell components, each shell component having a generally planar major broad section and laterally extending wall sections, the wall sections being welded together to form a peripheral wall of a substantially hollow body between the first and second ends, wherein a dimension of the peripheral wall is less than a dimension of the major broad section, so that the substantially hollow body is wider in a lateral direction than in a vertical direction, and the support plate extends generally perpendicular to planes of the major broad sections so that a stub axle attached to the support plate extends generally perpendicular to the planes of the major broad sections.

2. A suspension assembly according to claim 1, the first and second shell components of the suspension assembly being substantially identical to each other.

3. A suspension assembly according to claim 1, the wall sections extending generally normal to the major broad section.

4. A suspension assembly according to claim 1, the wall sections each having a peripheral edge distal to the major broad section and the first and second shell components being welded together along the peripheral edges of the respective wall sections.

5. A suspension assembly according to claim 4, the peripheral edges being turned out of the plane of the wall sections.

6. A suspension assembly according to claim 5, the peripheral edges being turned out of the plane of the wall sections to extend generally parallel to the major broad section.

7. A suspension assembly according to claim 1, the hollow body being formed to have a pair of side walls and opposite first and second ends.

8. A suspension assembly according to claim 7, the side walls extending in a direction between the first and second ends of the suspension assembly.

9. A suspension assembly according to claim 8, the hollow body being formed as a parallelogram in which the side walls are generally parallel.

10. A suspension assembly according to claim 8, the hollow body being formed as a parallelogram in which the side walls taper from one end to the opposite end to form a narrow end and a wide end.

11. A suspension assembly according to claim 10, the narrow end of the hollow body connecting to an assembly for attachment of a damping arrangement and a stub axle and the wide end connecting to an assembly for pivotal mounting to a support member of the vehicle.

12. A suspension assembly according to claim 7, the peripheral wall of the hollow body including an end wall at the first end of the suspension assembly extending laterally to the side walls.

13. A suspension assembly according to claim 12, the hollow body including openings on either side of the end wall and cylinders mounted within the openings for facilitating pivotal mounting of the suspension assembly to a structural member.

14. A suspension assembly according to claim 1, the assembly for attachment of a damping arrangement and a stub axle includes a first support plate that supports one end of a spring or air bag or other damper, an attachment portion for the attachment of one end of one or more shock absorbers, the attachment portion being a second support plate that extends generally perpendicular to the first support plate.

15. A suspension assembly according to claim 14, the assembly for attachment of a damping arrangement and a stub axle includes an attachment portion for the attachment of the stub axle, the attachment portion being a third support plate that extends generally perpendicular to the first support plate and generally parallel to the second support plate, but which is spaced from the second support plate and which is positioned approximately aligned with the side of the vehicle to which the suspension assembly is attached.

16. A suspension assembly according to claim 15, the stub axle being bolted to the third support plate, and the third support plate including multiple openings or an array of openings, so that the stub axle can be positioned on or connected to the third support plate at different positions.

* * * * *